(12) United States Patent
McCormick et al.

(10) Patent No.: US 9,584,624 B2
(45) Date of Patent: Feb. 28, 2017

(54) METHOD AND SYSTEM FOR TRANSMITTING AN APPLICATION TO A DEVICE

(75) Inventors: William Carson McCormick, Kanata (CA); Paul Mark Joseph Dumais, Kanata (CA); Trevor Peter Sweeney, Kanata (CA); Scott Bjorn Birksted, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 1234 days.

(21) Appl. No.: 12/815,446

(22) Filed: Jun. 15, 2010

(65) Prior Publication Data

US 2011/0258301 A1 Oct. 20, 2011

Related U.S. Application Data

(60) Provisional application No. 61/324,589, filed on Apr. 15, 2010.

(51) Int. Cl.
*G06F 15/177* (2006.01)
*H04L 29/08* (2006.01)

(52) U.S. Cl.
CPC ............. *H04L 67/34* (2013.01); *H04L 67/02* (2013.01); *H04L 67/04* (2013.01)

(58) Field of Classification Search
CPC .... H04L 29/12132; H04L 41/028; H04L 7/00
USPC ....................................................... 709/222
See application file for complete search history.

(56) References Cited

U.S. PATENT DOCUMENTS

| 6,557,054 | B2 | 4/2003 | Reisman |
| 7,257,583 | B2 | 8/2007 | Hofmeister et al. |
| 7,461,319 | B2 * | 12/2008 | Hanam et al. ................ 714/751 |
| 7,971,147 | B2 * | 6/2011 | Subbarao et al. ............ 715/762 |
| 7,972,215 | B2 * | 7/2011 | Evans et al. ..................... 463/42 |
| 8,145,570 | B2 * | 3/2012 | Major et al. .................... 705/51 |
| 8,272,030 | B1 * | 9/2012 | Annan et al. .................... 726/1 |
| 2003/0115227 | A1 * | 6/2003 | Guthery ........................ 707/205 |
| 2004/0133678 | A1 * | 7/2004 | Tamura ......................... 709/225 |
| 2006/0073785 | A1 | 4/2006 | Klassen et al. |
| 2006/0168134 | A1 * | 7/2006 | Berger et al. ................ 709/219 |

(Continued)

FOREIGN PATENT DOCUMENTS

| EP | 1760991 | 3/2007 |
| EP | 2175613 | 4/2010 |

OTHER PUBLICATIONS

ActiveSync Functions, by MSDN, 4 pages published Apr. 8, 2010.*

(Continued)

*Primary Examiner* — Richard G Keehn
(74) *Attorney, Agent, or Firm* — Rowand LLP

(57) ABSTRACT

A method and system are provided for triggering a transmittal of an application to a device connected to a host computer. The method comprises: displaying in a web browser on the host computer a list of at least one application available for download to the device; receiving instructions through the web browser to download the application to the device; and in response to receiving instructions to download the application to the device: i) transmitting a request for the application to an application delivery server; ii) receiving the application from the application delivery server at the host computer; and iii) transmitting the application from the host computer to the device.

24 Claims, 10 Drawing Sheets

(56) References Cited

U.S. PATENT DOCUMENTS

| | | | |
|---|---|---|---|
| 2006/0204947 A1* | 9/2006 | Berger et al. | 434/323 |
| 2006/0259589 A1* | 11/2006 | Lerman et al. | 709/219 |
| 2006/0263756 A1* | 11/2006 | Berger et al. | 434/323 |
| 2007/0083906 A1* | 4/2007 | Welingkar | 725/110 |
| 2007/0198674 A1* | 8/2007 | Li et al. | 709/223 |
| 2007/0244987 A1 | 10/2007 | Pedersen et al. | |
| 2007/0245409 A1* | 10/2007 | Harris et al. | 726/5 |
| 2008/0148362 A1 | 6/2008 | Gilder et al. | |
| 2008/0261689 A1* | 10/2008 | Evans et al. | 463/29 |
| 2008/0288890 A1* | 11/2008 | Anderson et al. | 715/810 |
| 2009/0157794 A1* | 6/2009 | Sheshadri et al. | 709/202 |
| 2009/0160618 A1* | 6/2009 | Kumagai et al. | 340/10.1 |
| 2009/0254778 A1* | 10/2009 | Huang et al. | 714/38 |
| 2009/0298478 A1 | 12/2009 | Tyhurst et al. | |
| 2009/0300137 A1 | 12/2009 | Tyhurst et al. | |
| 2009/0300596 A1 | 12/2009 | Tyhurst et al. | |
| 2010/0017302 A1* | 1/2010 | Scipioni | 705/26 |
| 2010/0023582 A1* | 1/2010 | Pedersen et al. | 709/203 |
| 2010/0161720 A1* | 6/2010 | Colligan et al. | 709/203 |
| 2010/0280873 A1* | 11/2010 | Bryant | 705/10 |
| 2010/0319054 A1* | 12/2010 | Mehta et al. | 726/4 |
| 2011/0035431 A1* | 2/2011 | Geary et al. | 709/203 |
| 2011/0038470 A1* | 2/2011 | Kent | 379/142.04 |
| 2011/0138064 A1* | 6/2011 | Rieger et al. | 709/228 |
| 2011/0213667 A1* | 9/2011 | Ierullo | 705/14.64 |
| 2011/0276961 A1* | 11/2011 | Johansson et al. | 717/178 |

OTHER PUBLICATIONS

"Pocket PC 2002 10 Minute Guide", 26 pages, published in 2003, authored by Michael Miller.*

Research in Motion Limited, Blackberry Application Web Loader Version 1.0, Blackberry Application Web Loader Developer Guide, Feb. 22, 2006.

Apple Inc., Apple—iPhone—Download music from the iTunes Store on iPhone, http://web.archive.org/web/20090626055020/http://www.apple.com/iphone/iphone-3gs/itu . . . , p. 1, Jun. 26, 2009.

EFRAC, Ovi Store, IQ Lite, http://web.archive.org/web/20100412013502/http://store.ovi.com/content/26030?click Sour . . . , pp. 1-9, Apr. 12, 2010.

Apple Inc., Apple—iPhone—Download games and applications for iPhone, App Store, http://web.archive.org/web/20090626025309/http://www.apple.com/iphone/iphone-3gs/ap . . . , p. 1-2, Jun. 26, 2009.

Extended European Search Report, EP Application No. 10165973.8.

Apple—iTunes—Everything you need to be entertained; www.apple.com/itunes/; 2 pages.

Android Market; www.android.com/market/; 1 page.

Ovi Store: IQ Lite; http://store.ovi.com/content/26030?clicksource=browse&contentarea=applications; 1 page.

Introducing Nokia Ovi Suite—Flash Player Installation; Nokia Ovi Suit; http://www.comms.ovi.com/m/p/ovi/suite/index_en_uk.html.

Apple—iPhone—Learn about apps available on the App Store; http://www.apple.com/iphone/apps-for-iphone/; 1 page.

Ovi by Nokia—Mobile maps, music downloads, mobile games, photos sharing, files storage; http:///www.ovi.com/services/worldwide; 1 page.

CIPO, CA Office Action relating to Application No. 2,736,290 dated Jan. 20, 2014.

CIPO CA Office Action relating to Application No. 2,736,290, dated Apr. 21, 2016.

CIPO, CA Office Action relating to Application No. 2,736,290, dated Apr. 15, 2015.

* cited by examiner

METHOD AND SYSTEM FOR TRANSMITTING AN APPLICATION TO A DEVICE

CROSS-REFERENCE TO RELATED APPLICATIONS

This application claims the benefit of and priority to U.S. provisional patent application Ser. No. 61/324,589 filed Apr. 15, 2010, the contents of which are incorporated herein by reference.

TECHNICAL FIELD

The present disclosure relates to application delivery systems, and more particularly to a method and system for transmitting an application from an application delivery server to a device.

BACKGROUND

Mobile communication devices may be designed in order to permit applications to be installed to provide additional functionality to such devices. For example, such applications may include messaging applications, media player applications, games, etc.

Mobile communication devices often permit users to download additional applications via wireless communication with an application delivery server.

The download of applications in this manner may, in various systems, be quite slow. Also, in some situations, the download of applications in this manner may be costly since it results in the consumption of wireless bandwidth.

Thus, there exists a need to provide improved methods and systems for transmitting applications to devices, such as mobile communication devices.

BRIEF DESCRIPTION OF THE DRAWINGS

It will be noted that throughout the drawings and description similar features are identified by the same reference numerals.

DETAILED DESCRIPTION OF EXAMPLE EMBODIMENTS

The present disclosure describes a method for triggering a transmittal of an application to a device (such as a mobile device or mobile communications device, in which example embodiments are described herein) connected to a host computer. The method comprises: displaying in a web browser on the host computer a list of at least one application available for download to the device; receiving instructions through the web browser to download the application to the device; and in response to receiving instructions to download the application to the device: i) transmitting a request for the application to an application delivery server; ii) receiving the application from the application delivery server at the host computer; and iii) transmitting the application from the host computer to the device.

The present disclosure also describes a server comprising a memory storing a web application configured to: display in a web browser on a host computer a list of at least one application available for download to a device; receive instructions through the web browser to download the application to the device; and in response to receiving instructions to download the application to the device: i) transmit a request for the application to an application delivery server; ii) receive the application from the application delivery server at the host computer; and iii) transmit the application from the host computer to the device.

Other example embodiments of the present application will be apparent to those of ordinary skill in the art from a review of the following detailed description in conjunction with the drawings.

Example embodiments of the present application are not limited to any particular operating system, mobile device architecture, server architecture, or computer programming language.

System Overview

Figure 1:
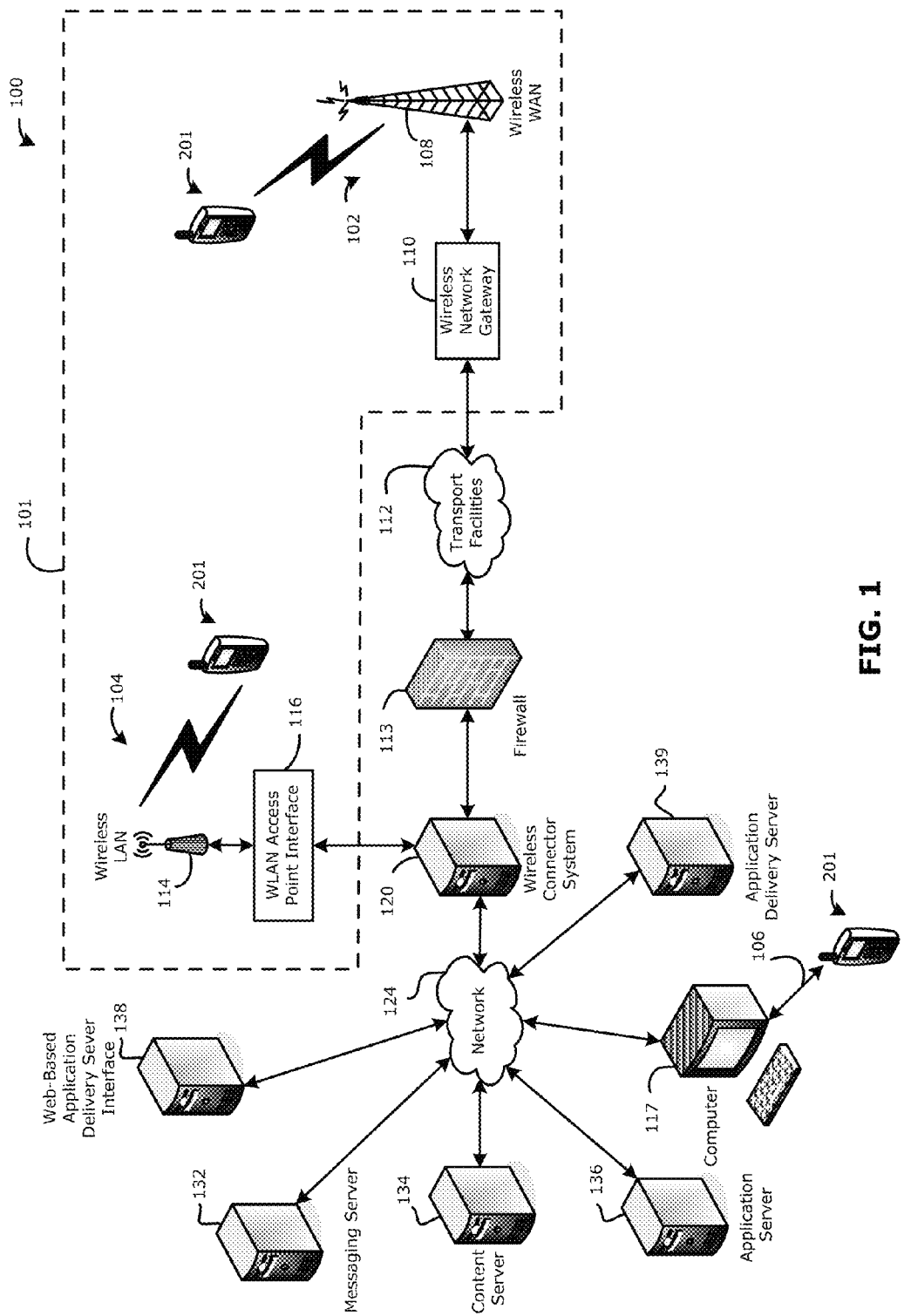
FIG. 1 is a block diagram illustrating a communication system including a mobile communication device to which example embodiments of the present disclosure can be applied.

In order to facilitate an understanding of one possible environment in which example embodiments described herein can operate, reference is first made to FIG. 1 which shows in block diagram form a communication system 100 in which example embodiments of the present disclosure can be applied. The communication system 100 includes a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, application delivery server 139 or application servers 136. Conversely, the wireless connector system 120 sends data packets received, for example, from the messaging server 132, content server 134, application delivery server 139 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, application delivery server 139 and application server 136.

The network 124 may include a private local area network, metropolitan area network, wide area network, the public Internet or combinations thereof and may include virtual networks constructed using any of these, alone, or in combination.

A link 106 may be provided for exchanging information between the mobile communication device 201 and a host computer 117 connected to a network 124, such as the Internet. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and host computer 117. In one example embodiment, the link 106 is a USB connection to the mobile communication device 201.

Figure 3:
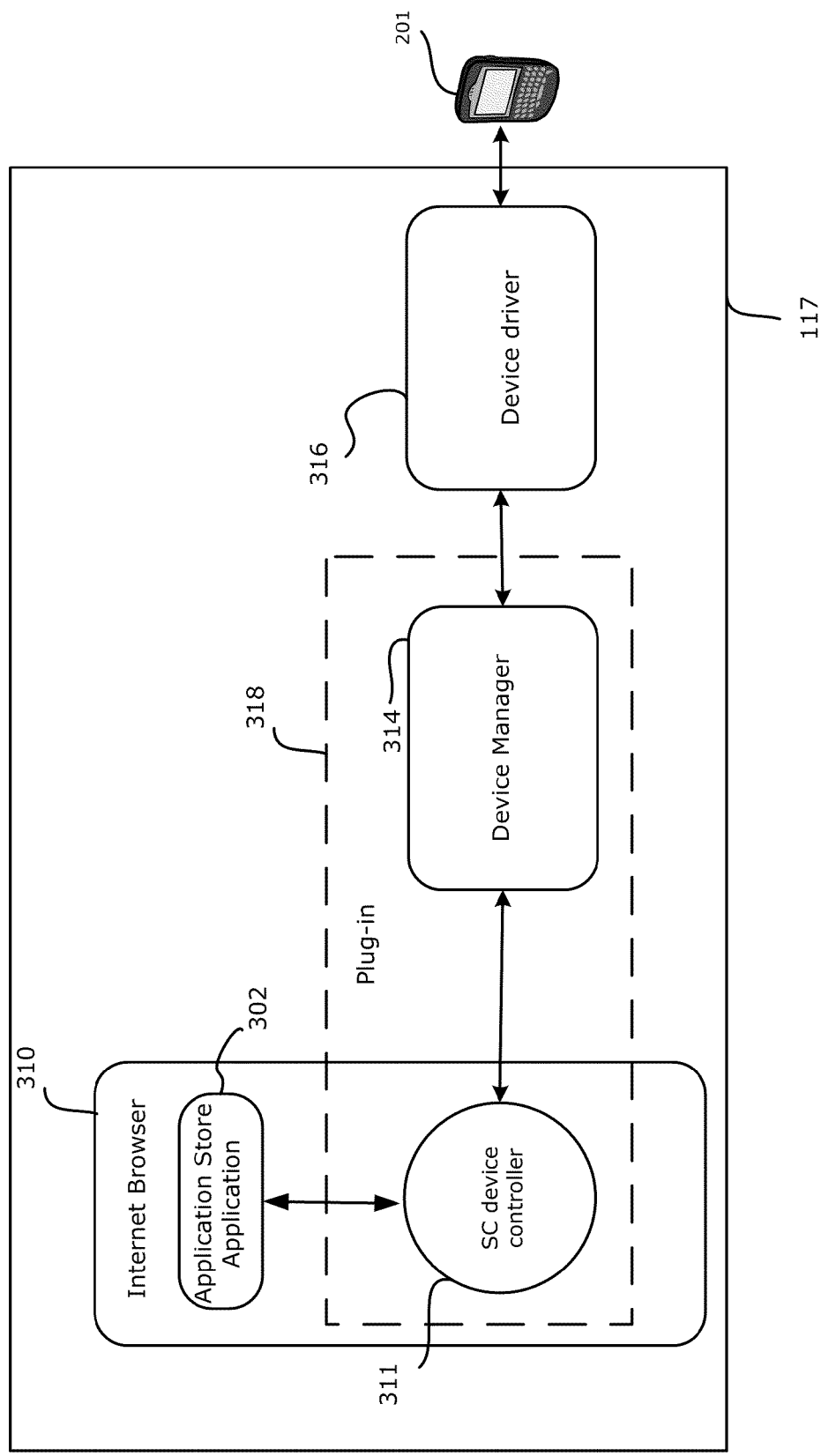
FIG. 3 is a block diagram illustrating a device communications infrastructure utilized by a Web-based application store application on a computer in accordance with one example embodiment of the present disclosure.

The host computer 117 has access to a web-based or Internet-based application delivery server interface 138 through an Internet browser on the host computer 117. The Internet browser (also known as a web browser) on the host computer 117 may access the web-based application delivery server interface 138 by establishing a hypertext transfer protocol (HTTP) connection or hypertext transfer protocol secure (HTTPS) connection to the web-based application delivery server interface 138 which is comprised of a web server, accessible through the Internet. The web server includes memory which has stored thereon a web-based application store application 302 (FIG. 3).

The web-based application delivery server interface 138 may provide the web-based application store application 302 (FIG. 3) to the Internet browser on the host computer 117. The web-based application store application 302 (FIG. 3) permits users to download applications from an application delivery server 139 to a device 201 connected to the host computer 117 via the link 106. The web-based application store application is a web-based client for end users which is described in greater detail below. In some example embodiments, the application store application 302 may provide functions or features in addition to or instead of the ability to purchase and download applications to the device 201. In some example embodiments, the web based application store application may provide other device management functions. In such example embodiments, the web based application store application 302 (FIG. 3) may also be referred to as a web-based application management application.

In some example embodiments, such as the example embodiment shown in FIG. 1, the web-based application delivery server interface 138 and the application delivery server 139 may be separate servers. These servers 138 and 139 may be connected either directly or through a network 124.

In other example embodiments, the functions of the web-based application delivery server interface 138 and the application delivery server 139 may be performed on a common server. In either case, the application delivery server 139 may be accessed, either directly or indirectly, by a web-based application store application 302 (FIG. 3) which is run through an Internet browser on the host computer 117. The web-based application store application (FIG. 3) may be received, for example, by the host computer 117 when the Internet browser on the host computer 117 navigates to a location associated with the web-based application delivery server interface. For example, the Internet browser may navigate to the web-based application delivery server interface 138 using a uniform resource locator (URL) associated with the web-based application delivery server interface 138.

Figure 2:
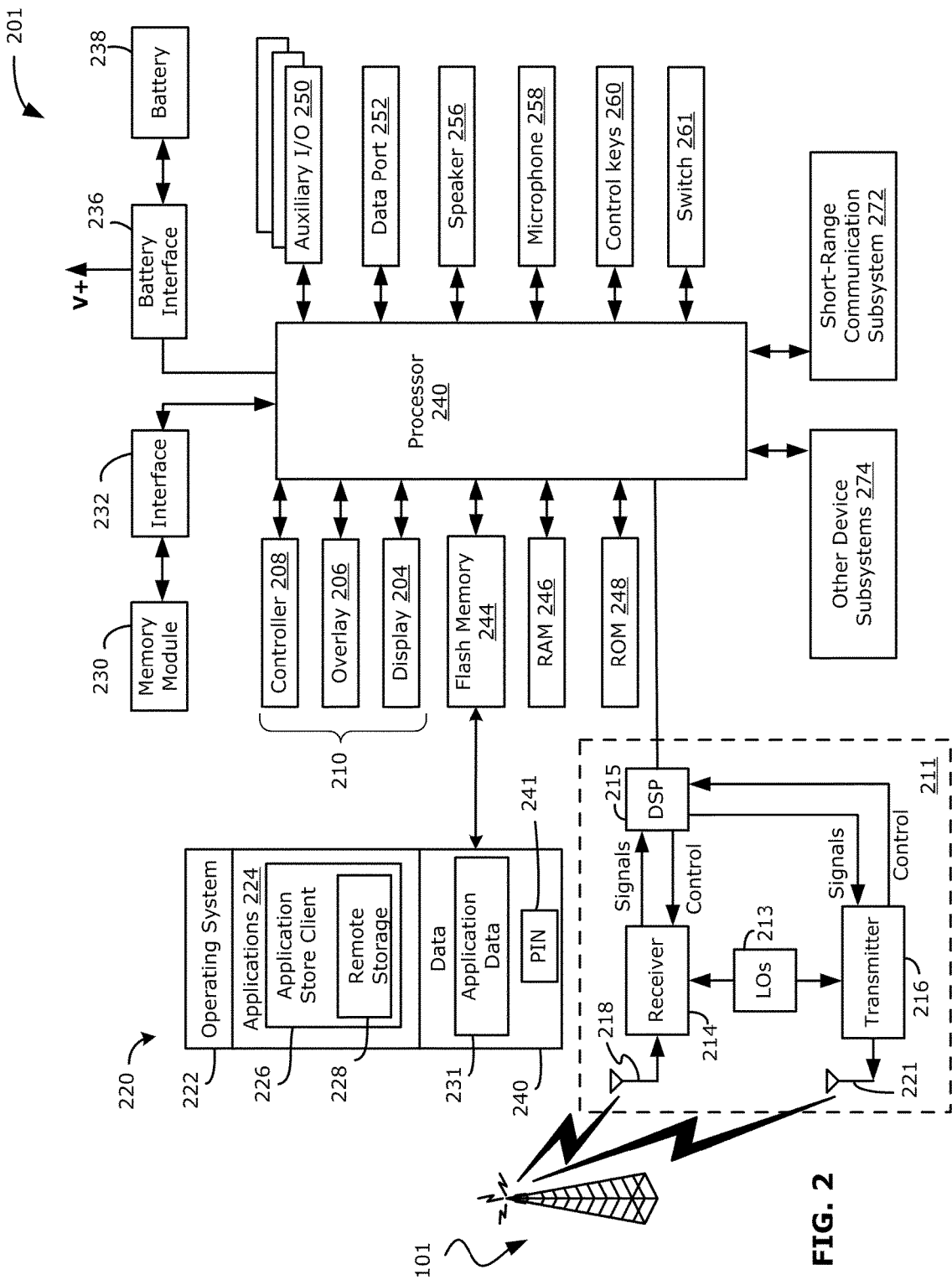
FIG. 2 is a block diagram illustrating a mobile communication device in which example embodiments of the present disclosure can be applied.

The application delivery server 139 is configured to deliver applications to the mobile devices 201 upon request by the host computer 117. Applications are programs that include instructions for the mobile device 201 which provide a user of the mobile device 201 with tools to accomplish a task. By way of non-limiting example, the applications may include word processor applications, media player applications, database applications, games, etc. The application delivery server 139 may be configured to act as a remote storage facility for the mobile device 201 to permit users of the mobile communication devices 201 to re-download applications that were previously downloaded, purchased and/or otherwise acquired. In at least some example embodiments, the application delivery server 139 acts as, or interfaces with an application data backup server which is configured to store application data 231 (FIG. 2). Application data is data which is used by an application and which is, generally, user or device specific data. The application data may, in various example embodiments, include user settings or preferences associated with an application, user achievements (i.e. high scores associated with a game), etc. The application data is, in at least some example embodiments, configured or created by a user of the mobile device 201 or by the mobile device 201 itself.

The host computer 117 typically comprises a controller having at least processor (i.e., microprocessor) for controlling its operation, a communications subsystem connected to the processor for communicating with the communication system 100, a display screen or monitor connected to the processor, one or more user input devices such as a keyboard and mouse connected to the processor for sending user input signals to the processor in response to user inputs, a memory or storage element connected to the processor such as a hard disk drive (HDD), RAM, ROM and/or other suitable memory connected to the processor, and other suitable input and output devices (not shown) as desired or required. The memory has data and instructions stored thereon for configuring the processor and host computer 117. Operating system software, software applications, and data used by the processor are stored in the memory. The software and data configure the operation of the host computer 117. Other features of the host computer 117 for implementing the processes and functions described herein will be appreciated by persons ordinarily skilled in the art.

It will be appreciated that the above-described communication system is provided for the purpose of illustration only, and that the above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Example Mobile Communication Device

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various example embodiments the mobile communications device 201 may be a data communication device, a multiple-mode communication device configured for both data and voice communication, a smartphone, a mobile telephone or a PDA (personal digital assistant) enabled for wireless communication, or a computer system with a wireless modem. The mobile communications device 201 may also be referred to as a mobile device 201 and, in some cases, as a device 201.

The mobile communication device 201 includes a controller including at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems. In some example embodiments, the mobile device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 act as an input mechanism to provide a touch-sensitive input device. The processor 240 also interacts with the touch-sensitive overlay 206 via the electronic controller 208. In other example embodiments, the display 204 may not be a touchscreen display. Instead, the mobile device 201 may simply include a non-touch display and one or more input mechanisms, such as, for example, a depressible scroll wheel or other control keys 260.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which the mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

The processor 240 operates under stored program control and executes software modules 220 stored in memory such as persistent memory, for example, in the flash memory 244. As illustrated in FIG. 2, the software modules 220 include operating system software 222, software applications 224 which include an application store client 226.

The application store client 226 is configured to operate in a first operating mode in which it interfaces with a web-based application store application 302 (FIG. 3) on the host computer 117. In the first operating mode, the application store client 226 receives commands from the web-based application store application 302 (FIG. 3) on the host computer 117. The commands are related to the management of applications on the device 201. In this mode, the device 201 may operate without direct input from a user on the device 201. That is, the user may control the host computer 117 through the web-based application store application 302 (FIG. 3) operating in an Internet browser. As will be explained in greater detail below, the web-based application store application 302 (FIG. 3) may interact with a plug-in to send data to the device 201 and to receive data from the device 201. Such data may include the commands related to the management of applications on the device 201.

The commands received by the application store client 226 from the host computer 117 may be instructions to, among other things, store a received application on the device 201 (which may be referred to as a storage command), install a received application to the device 201 (which may be referred to as an installation command), delete an application from the device 201 (which may be referred to as a delete command), send device configuration information or other requested information from the device 201 to the host computer 117, provide installation status information to the host computer 117, reset the device 201 (which may be referred to as a reset command), etc.

The application store client 226 is configured to perform an associated function upon receiving a command from the host computer 117. For example, in at least some example embodiments, the application store client 226 is configured to receive a command from the host computer 117 to install an application (i.e. an installation command) to the device 201. In response to receiving an installation command, the application store client 226 is configured to install that application to the device 201. Similarly, in response to receiving a command to delete an application from the device 201 (i.e. a delete command), the application store client 226 may delete that application from the device 201.

Similarly, in response to receiving a request for device configuration information, the application store client 226 may transfer device configuration information to the host computer 117. The device configuration information may, in various example embodiments, include information specifying any one or more of the following: a unique identification number, such as a PIN 241, associated with the device 201, a version number of an operating system 222 or another software application 224 stored on the device (such as, for example, the application store client 226), memory usage information such as information quantifying the free memory on the device 201, and/or information identifying applications 224 installed on the device 201. Other device configuration information is also possible.

Similarly, in response to receiving a request for installation status information (or in response to receiving a command to install an application on the device), the application store client 226 may provide installation status information to the host computer 117 to update the host computer as to the status of the installation. Such installation status information may include, for example, a quantifier as to the progress of the installation (for example, in terms of percentage complete, time remaining, etc).

In response to receiving a command to reset the device 201 (i.e. a reset command), the application store client 226 may cause the device 201 to be reset. In some embodiments, resetting the device 201 may include performing a power cycle on the device 201.

The application store client 226 may, in some example embodiments, be configured to operate in a second operating mode in which it is configured to interact directly with the application delivery server 139 without engaging the web-based application delivery server interface 138 or the host computer 117. That is, the application store client 226 may, in the second operating mode, communicate with the application delivery server 139 through the WWAN 102 or WLAN 104. The second operating mode may be useful when the device 201 is not connected to a host computer 117.

In the second operating mode, a user of the mobile communication device 201 may request an application from the application delivery server 139 by interacting with the application store client 226 on the mobile device; for example, by using the touchscreen display 210, control keys 260 or other input mechanism. In response to receiving a request to download an application from the user, the application store client 226 of the mobile communication device 201 may transmit a download request to the application delivery server 139 over the WWAN 102 or WLAN 104. The application store client may then wait for the application delivery server 139 to transmit the specified application to the mobile device 201 over the WWAN 102 or WLAN 104. The mobile device 201 then receives the application from the application delivery server 139.

The second operating mode may include a graphical user interface which is displayed on the display 204 of the mobile device 201 which provides an interface to users of the mobile device 201 which permits users to browse or search for applications available on the application delivery server 139.

In the first operating mode, the application store client 226 operates in a more passive role than in the second operating mode. That is, in the first operating mode users browse for, select, and otherwise manage applications through an input mechanism associated with the host computer 117. The host computer 117 downloads applications through the application delivery server 139 and transfers such applications to the device 201. In contrast, in the second operating mode, the application store client 226 allows users to interact with the application delivery server 139 directly from the mobile device 201. That is, in the second operating mode the application store client 226 provides a graphical user interface on the device 201 which allows users of the device 201 to browse for, select, and otherwise manage applications. In this second operating mode, the application store client 226 communicates directly with the application delivery server 139 through the WLAN 104 or WWAN 102.

It will be appreciated that, in some example embodiments, an efficiency is realized by providing the first operating mode functions of the application store client 226 (i.e. the ability to execute the functions described herein in response to receiving commands from the host computer 117) and the second operating mode functions of the application store client 226 (i.e. the ability to interact with the application delivery server 139 directly), in a common application since many of the functions that are performed on the device 201 are common in either operating mode. For example, in both operating modes, the application store client 226 may be configured to receive a command to install an application (i.e. an installation command) and, in response, to begin the installation of that application.

However, it will be appreciated that in other example embodiments, the functions described herein may be split into multiple applications, each performing a subset of the functions of the application store client 226.

The application store client 226 may, in some example embodiments, include a remote storage module 228 which is configured to permit applications which have been removed from the device 201 to be reinstalled to the device 201 following their removal. In at least some example embodiments, when an application is removed from the mobile device 201 (for example, when it is deleted by the user, or in response to receiving a delete command from the host computer 117), application data 231 associated with that application may be transmitted to a remote server, such as the application delivery server 139. This transfer may be done either directly (i.e. through the WWAN or WLAN) or may be done via the host computer 117. The application delivery server 139 may store the application data 231 in a memory 344 (FIG. 3). In some example embodiments, application data 231 may be retrieved from the server and restored on the mobile device 201 if and when the application is retrieved.

In some example embodiments, the remote storage module 228 is configured to interact with the application delivery server 139 to provide remote storage capabilities for the mobile device.

In some example embodiments, where the application store client 226 is configured to operate in the second operating mode (i.e. where it provides a graphical user interface allowing the user to interact with the application delivery server 139 from the device 201 itself), the remote storage module 228 may be configured to transmit identification information to the application delivery server 139. The remote storage capabilities may be related to either a user, account, or, in some example embodiments, a specific device. The identification information may, in some example embodiments, identify the mobile device 201. For example, the identification information may be the Personal Identification Number ("PIN") 241 associated with the mobile device 201. In other example embodiments, the identification information may identify a user or account associated with the mobile device 201. For example, the identification information may include one or more of a username and/or password, log-in information associated with the user or account, a unique identification number associated with the user or account, and/or an email address associated with the user or account.

The application delivery server 139 may determine, from the identification data, any applications that are available for re-download and may transmit data identifying those applications to the mobile device 201.

The applications which are said to be available for re-download may, in some example embodiments, be applications which were previously downloaded by either the mobile device 201 or by another mobile device associated with the same user (i.e. applications which the user and/or device 201 has rights to by virtue of a prior purchase and/or download). In some example embodiments, the applications which are said to be available for re-download are applications which the user of the mobile device 201 has previously purchased.

The remote storage module 228 of the mobile device 201 may be configured to display, on the display screen 204, data received from the application delivery server 139 which identifies at least one application available for re-download. For example, it may display data identifying one or more previously downloaded application which is available for re-download to the mobile device 201. The displayed data may be presented in a list format in some example embodiments. The list may include two or more applications which are available for re-download to the mobile device 201.

In some example embodiments, a user may request that an application be re-downloaded to the mobile device 201 using an input mechanism associated with the mobile device; for example, the touchscreen display 210 or the control keys 260. The user may navigate, through a display screen containing a plurality of applications available for re-download, to a desired application available for re-downloading and select a "download" or other option to initiate the re-downloading of the application.

Upon receiving a user input to re-download an application, the remote storage module 228 of the application store client 226 transmits a request to the application delivery server 139 to request the delivery of the application. The request includes an identifier, such as a product number, associated with the application which permits the application delivery server 139 to determine the application that the request relates to. The application delivery server 139 may then cause the application to be transmitted and the application is received at the mobile communication device. In some example embodiments, the application may be automatically installed following its receipt.

The remote storage module 228 may, in some example embodiments, be launched from within the application store client 226 when the application store client 226 is operating in the second operating mode. That is, the user may load the application store client 226 and may select an option to load the remote storage module 228 portion of the application store client 226. For example, the user may select an option entitled "Digital Storage Locker", "Remote Applications", "Previously Downloaded Applications" or "My World™" or an option with another similar descriptor. In other example embodiments, the remote storage module 228 may be a stand-alone component that is operationally separate from the application store client 226 and that is loadable by selecting an appropriate icon in an icon grid on a home page associated with the mobile device 201.

The application store client 226 and the remote storage module 228 may, among other things, be implemented through stand-alone software applications, or combined together in one or more of the operating system 222 and applications 224. In some example embodiments, the functions performed by the above identified applications 224 may be realized as a plurality of independent elements, rather than a single integrated element, and any one or more of these elements may be implemented as parts of other software applications.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications, including, for example, an address book application, a messaging application, a calendar application, and/or a notepad application. In some example embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application.

In some example embodiments, the auxiliary input/output (I/O) subsystems 250 may include an external communication link or interface, for example, an Ethernet connection. The mobile communication device 201 may include other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may include a vibrator for providing vibratory notifications in response to various events on the mobile communication device 201 such as receipt of an electronic communication or incoming phone call, or for other purposes such as haptic feedback (touch feedback).

In some example embodiments, the mobile communication device 201 also includes a removable memory module 230 (typically including flash memory, such as a removable memory card) and a memory interface 232. Network access may be associated with a subscriber or user of the mobile communication device 201 via the memory module 230, which may be a Subscriber Identity Module (SIM) card for use in a GSM network or other type of memory card for use in the relevant wireless network type. The memory module 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various example embodiments, the data 240 includes service data including information required by the mobile communication device 201 to establish and maintain communication with the wireless network 101. The data 240 may also include user application data 231 such as email messages, address book and contact information, calendar and schedule information, notepad documents, image files, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the mobile device memory. The application data 231 may include application data 231 which is associated with a specific application. For example, an application which is a game may have associated application data 231 specifying high scores, etc.

In some example embodiments, the data 240 may include identification data such as a Personal Identification Number ("PIN") 241 identifying either the user or the mobile device. In some example embodiments, the PIN is a unique identifier assigned to the mobile communication device 201 during manufacturing of that device 201. The PIN may be saved in non-volatile memory so that the mobile device will retain the PIN even when it is powered off. In some example embodiments the identification data, such as the PIN 241 may be transmitted to the application delivery server 139 as part of the purchase, download, or re-download method associated with the delivery and/or subsequent re-delivery of an application from the application delivery server 139 to the mobile communication device 201.

The serial data port 252 may be used for synchronization with a user's host computer 117 and for interacting with a web-based application store application on the host computer 117.

In some example embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 222 or software applications 224 may also be loaded onto the mobile communication device 201 through the wireless network 101, the auxiliary I/O subsystem 250, the data port 252, the short-range communication subsystem 272, or other suitable subsystem 274 other wireless communication interfaces. The downloaded applications or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Web-Based Device Management Application

Referring now to FIG. 3 a web-based application store application 302 in accordance with one example embodiment of the present disclosure will now be described. The web-based application store application 302 is a web-based client interface which allows users to download applications to their mobile communication devices 201 or, in some example embodiments, otherwise manage applications on their mobile communication devices 201. The web-based application store application 302 works in conjunction with the application delivery server 139.

The application delivery server 139 is a server side component which processes and manages server side web-based application store application 302 tasks. The web-based application store application 302 provides users with the ability to perform a controlled set of self-serve operations. Depending on the embodiment, the web-based application store application 302 allows device users to: (i) browse for applications available through the application delivery server 139; (ii) retrieve applications available through the application delivery server 139; (iii) send applications available through the application delivery server 139 to the device 201; (iv) retrieve, from the application delivery server 139, applications previously downloaded to the device 201 (or a device 201 associated with the same user), which have since been deleted from that device 201; and/or (iv) delete applications on the device 201. Other features and functions may be provided in addition to or instead of the features and functions listed above.

The web-based application store application 302 may be accessed from a host computer 117 having an Internet connection and any necessary communication component installed (i.e., any communication interfaces and device communication stack components).

Referring again to FIG. 3, the communications infrastructure utilized by the web-based application store application 302 to communicate with the mobile communication device 201 in accordance with one example embodiment of the present disclosure will now be described.

The web-based application store application 302 may be implemented in Dynamic HTML (Hypertext Markup Language) (DHTML) via a series of web page(s) displayed in an Internet browser 310 running on the computer 117. The DHTML of the web page(s) is provided by markup document(s) written in DHTML which are retrieved by an HTTP server or Internet server, such as the web-based application delivery server interface 138 (FIG. 1) in response to a direct or indirect request from the computer 117 (e.g. by an HTTP request to access or "Go" to a respective URL or web address). The Internet browser 310 communicates with a mobile communication device 201 via a device manager 314.

The device manager 314 in turn communicates with connected mobile communication devices 201 via device drivers 316. The device drivers are typically device drivers for a USB device. A USB Device is a device that uses USB as the physical transport layer for wireline communications with the host computer 117. USB devices are connected to a USB port on the host computer 117 or a USB hub that is connected to a USB port on the host computer 117. USB device drivers are installed in the operating system 222 (FIG. 2) of the computer 117 in order to enable wireline communications to a USB device.

It will be appreciated, however, that other device drivers are possible for communicating with devices 201 using other protocols. For example, in some example embodiments, a serial device driver may be provided for communicating with serial devices. Similarly, in other example embodiments, a Bluetooth™ device driver may be provided for communicating with Bluetooth™ enabled devices. A serial device is a device that uses RS-232 (Recommended Standard-232) serial communications as the physical transport layer for wireline communications with the computer. Serial devices are connected to a serial port on the host computer 117, for example, through a "cradle" accessory. Serial device drivers are installed in the operating system of the computer 117 in order to enable wireline communications to a serial device. Typically, serial device drivers are provided with the operating system 222 of the computer 117 and need not be installed by the web-based application store application 302.

The device manager 314 is a program or program module which manages application-level wireline access to connected mobile devices 201, and/or possibly Bluetooth™ or other short-range wireless access to connected mobile devices 201. The device manager 314 provides a service routing application programming interface (API) which provides applications such as the web-based application store application 302 with the ability to route traffic through the serial data connection (for example, USB) or Bluetooth™ connection to the computer 117 using standard connectivity protocols. The device manager 314 also provides a number of device related communication services in addition to serial or Bluetooth™ data bypass connection functionality. The communication services provided to the web-based application store application 302 by the device manager 314 include the notification of device attach and detach events, tracking of serial bypass/Bluetooth™ statistics, and device communications multiplexing.

The Internet browser 310 is equipped with a scripting engine to run client-side scripts, such as a JavaScript scripting engine for running JavaScript, within the DHTML web page(s) of the web-based application store application 302. As will be appreciated by persons skilled in the art, JavaScript is a scripting language used in client-side web document, for example, in web pages. The DHTML web pages include JavaScript code (scripts) which interact with the Document Object Model (DOM) of the DHTML web pages. The JavaScript engine of the Internet browser 310 (also known as JavaScript interpreter or JavaScript implementation) is an interpreter that interprets JavaScript scripts embedded in or included from DHTML pages and executes the scripts accordingly. The Internet browser 310 provides a runtime environment for the JavaScript engine and typically uses the public API (application programming interface) to create objects and methods through which the JavaScript scripts can interact with external processes and devices. Within the JavaScript runtime environment, objects and data may be shared between the JavaScript engine and the other components of the Internet browser 310. In other example embodiments, other scripting languages may be used such as, for example, Visual Basic for Applications (VBA), VBScript, and Visual Basic .NET all from Microsoft Corporation.

The Internet browser 310 may be Internet Explorer™ by Microsoft Corporation, FireFox™ by Mozilla Corporation, or any other Internet browser having the necessary capabilities for implementing the functions described herein. In one example embodiment, the host computer 117 runs a Windows™ operating system (by Microsoft Corporation).

As will be appreciated by persons skilled in the art, dynamic HTML is a collection of technologies used to create interactive and animated web sites by using a combination: a static markup language (such as HTML), a client-side scripting language (such as JavaScript), a presentation definition language (such as Cascading Style Sheets (CSS)), and the Document Object Model. A DHTML web page is any web page in which client-side scripting changes variables of the presentation definition language, which in turn affects the appearance and function of otherwise "static" HTML page content after the page has been fully loaded and during the viewing process. Thus, an DHTML web page is "dynamic" in that its contents and function changes while the web page is being viewed, not in its ability to generate a unique web page with each page load. This is in contrast to the broader concept of a "dynamic web page" which is any web page generated differently for each user, load occurrence, or specific variable values. This includes web pages created by client-side or server-side scripting where the content is determined prior to being viewed within the Internet browser 310. Dynamic web pages lack the ability to affect contents or function changes while a web page is being viewed.

To implement some of the functionality of the web-based application store application 302, the Internet browser 310 communicates with the connected mobile communication devices 201 and has native communication with the connected mobile communication devices 201.

The Internet browser 310 uses a Scripting-language Capable/Compatible (SC) device controller 311 to interface the JavaScript engine of the Internet browser 310 with a device communications stack (the device manager 314 and device driver 316) of the mobile communication device 201. The SC device controller 311 is a device controller which is compatible with and which provides communications services to a scripting engine of an Internet browser. In particular, the SC device controller 311 provides communications services to the JavaScript layer of the DHTML web page(s) comprising: notifying of device attach and detach events; sending and receiving data to connected devices. Any other communications services which require native control by the JavaScript layer of the DHTML web page(s) may be performed by the SC device controller 311. In some example embodiments, for example, embodiments in which the Internet browser 310 is Internet Explorer™, the SC device controller 311 is implemented, in whole or in part, using one or more ActiveX Controls. ActiveX controls are a Microsoft™ COM (Component Object Model)-based technology for extending the functionality of Internet browsers with third party native code extensions.

In other example embodiments, such as example embodiments in which the Internet browser 310 does not support ActiveX controls (such as, for example FireFox™), the SC device controller 311 may be implemented through a Netscape Plug-in Application Programming Interface (NPAPI) plug-in.

In either case, the SC device controller 311 (and possibly the device manager 314) may be a plug-in 318 which is used to extend the function of the Internet browser. The plug-in 318 may provide the functions of the SC device controller 311 and, in some example embodiments, the device manager 314.

The SC device controller 311 provides the DHTML web page content hosted in the Internet browser 310 with a mechanism to interact with the mobile communication devices 201 connected to the computer 117. The SC device controller 311 (e.g., ActiveX control) is instantiated within the Internet browser 310 process, which exposes COM (Component Object Model) interfaces to permit the JavaScript scripting engine of the Internet browser 310 to interact with connected devices and to perform other client side operations using native code.

Although the device drivers 316 and device manager 314 have been described as separate communication components within the device communications stack of the mobile communication device 201, it will be appreciated by persons skilled in the art that the functions implemented by these communication components may be combined within a single communication component in other example embodiments, and possibly combined with the SC device controller 311 in some example embodiments.

Web-Based Application Management

Referring now to FIGS. 4 to 9, the web-based application store application 302 will be discussed in greater detail. FIGS. 4 to 9 illustrate methods for triggering a transmittal of an application to a device 201 connected to a host computer 117. The methods include steps which may be performed by the host computer 117 (FIG. 1), steps which may be performed by a server (which may be the web-based application delivery interface 138 (FIG. 1) and, in some cases, the application delivery server 139 (FIG. 1)), and steps which may be performed by the device 201 (FIG. 1). More particularly, the web-based application store application 302 (FIG. 3) may contain instructions for causing a processor (not shown) associated with the host computer 117 to perform the host-computer-specific steps. Similarly, the application store client 226 (FIG. 2) may contain instructions for causing a processor 240 associated with the device 201 to perform the device-specific steps. Similarly, the web-based application delivery server interface 138 (FIG. 1) and/or the application delivery server 139 may contain instructions for causing a processor associated with either of these servers to perform the server-specific steps.

Figure 4:
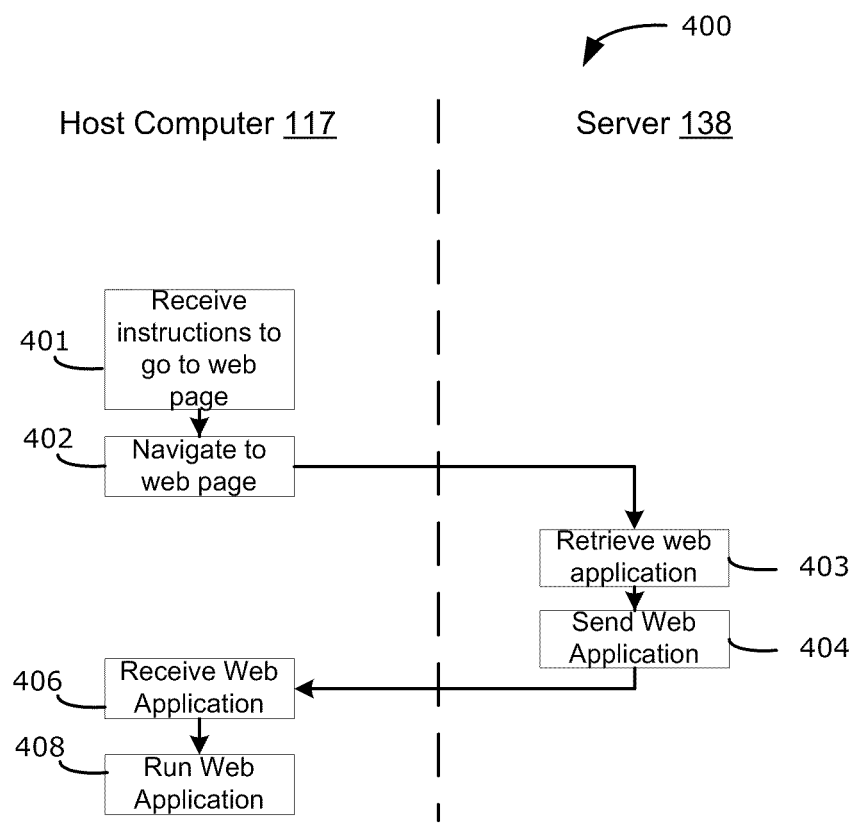
FIG. 4 is a flowchart illustrating a process for obtaining and running a web-based application store application in accordance with one example embodiment of the present disclosure.

Referring first to FIG. 4, a process 400 for obtaining and running the web-based application store application 302 (FIG. 3) is illustrated. The process 400 of FIG. 4 includes steps which may be performed by the host computer 117 (FIG. 1) and steps which may be performed by the web-based application delivery interface 138 (FIG. 1). In this example embodiment, the host-computer specific steps may be provided for by the Internet browser 310 (FIG. 3). That is, the Internet browser 310 may contain instructions for causing a processor associated with the host computer to perform the host-computer specific steps of the process 400. Similarly, the web-based application delivery server interface 138 may contain instructions for causing a processor associated with the web-based application delivery interface 138 to perform the server specific steps.

First, at step 401, the Internet browser 310 (FIG. 3) receives instructions to navigate to a web page. The instructions may be received, for example, by direct entry of a uniform resource locator (URL) associated with the web-based application delivery interface 138 into an address bar associated with the Internet browser. In other cases, the instructions may be received by selection of a link to a URL associated with the web-based application delivery interface 138. For example, the URL may be selected from a bookmarked link.

In response to receiving the instruction to navigate to the web page, the Internet browser 310 (FIG. 3), at step 402, navigates to the web page. That is, the Internet browser 310 (FIG. 3) may use the URL to establish a hypertext transfer protocol (HTTP) connection or hypertext transfer protocol secure (HTTPS) connection to the web-based application delivery server interface 138.

In response to the establishment of this connection, at step 403, the web based application delivery server interface 138 (FIG. 1) retrieves the web-based application store application 302 (FIG. 3) from a memory storage associated with the web-based application delivery server interface 138 (FIG. 1). Next, at step 404, the web-based application delivery server interface 138 sends the web application to the host computer 117. The web-based application delivery server interface 138 is received at step 406 and is run by the Internet browser at step 408.

After the application is run, it will perform one or more functions either immediately upon running or in response to the occurrence of one or more trigger conditions. The trigger conditions may be, for example, a selection, via an input mechanism associated with the host computer 117, of a selectable option to initiate one of the functions.

The web-based application store application 302 (FIG. 3) may, in various example embodiments, be configured to provide for any one or more of the following features and functions: (i) automatic delivery to the host computer 117 or device 201 of any required plug-in 318, device driver 316, and/or application store client 226 (FIG. 2); (ii) an application store interface for allowing a user of the host computer 117 to browse for, purchase, and download applications available for download to the device 201; (iii) a remote storage interface for allowing a user of the host computer 117 to browse for applications previously purchased (or downloaded, as the case may be) to the mobile device 201 (or in some example embodiments to a mobile devices 201 associated with a common user) and to install such applications to the same device 201 (or in some example embodiments to another mobile device associated with the same user); (iv) other application management functions, such as the ability to delete applications from the device 201. Additional features and functions may also be provided. Each of these functions will now be described in greater detail.

Automatic Delivery of a Plug-In, Device Driver, and/or Application Store Client

Figure 5:
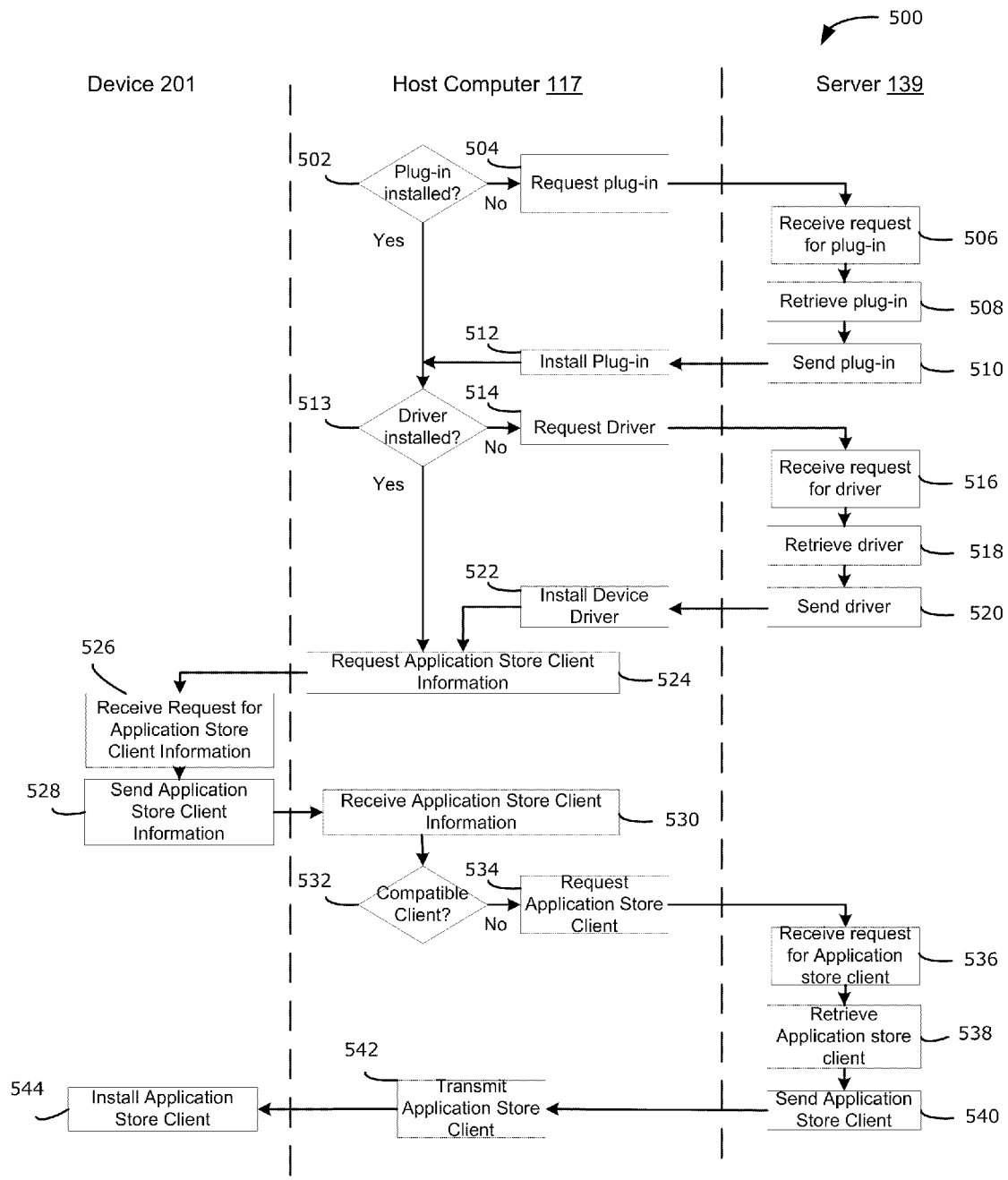
FIG. 5 is a flowchart illustrating a process for automatically delivering communication components in accordance with one example embodiment of the present disclosure.

Referring now to FIG. 5, in at least some example embodiments, the web-based application store application 302 (FIG. 3) is configured to automatically deliver a plug-in 318 (FIG. 3), device driver 316 (FIG. 3) and/or application store client 226 (FIG. 2).

FIG. 5 illustrates a process 500 for automatically delivering a plug-in 318 (FIG. 3), device driver 316 (FIG. 3) and/or application store client 226 (FIG. 2). The process 500 includes steps which may be performed by the host computer 117 (FIG. 1), steps which may be performed by a server (which may be the web-based application delivery interface 138 (FIG. 1) or the application delivery server 139 (FIG. 1)), and steps which may be performed by the device 201 (FIG. 1).

More particularly, the web-based application store application 302 (FIG. 3) may contain instructions for causing a processor (not shown) associated with the host computer 117 to perform the host-computer-specific steps. Similarly, the web-based application delivery server interface 138 (FIG. 1) and/or the application delivery server 139 may contain instructions for causing a processor associated with either of these servers to perform the server-specific steps.

Since a compatible application store client 226 (FIG. 2) is not, necessarily, installed on the device 201 (FIG. 2) during the period of time that the process 500 operates, the device-specific steps of the process 500 may be performed by an application other than the application store client 226. The device-specific steps of the process 500 are typically performed by a command interpreter which is known to be included on the device 201 or which is likely to be included on the device. For example, in some example embodiments, the device-specific steps of the process 500 are performed by a command interpreter that is included in the operating system 222 (FIG. 2).

In at least some example embodiments, the process 500 may be triggered when the web-based application store application 302 (FIG. 3) is run. That is, the process 500 may be configured to automatically determine whether components needed to communicate with the device 201 (such as the plug-in 318, device driver 316 and/or application store client 226) are installed. In other example embodiments, the process 500 may be triggered when a user attempts to initiate a process which would require device communications. For example, the process 500 may be triggered when the user selects an option to download an application to the device 201.

When the process 500 is triggered, at step 502, the web-based application store application 302 determines whether the plug-in 318 is installed on the host computer 117. Next, at step 504, if the host computer 117 does not already contain the plug-in, the plug-in is requested. In some example embodiments, if the host computer 117 does not include the plug-in, the web-based application store application 302 may automatically request the plug-in from a remote server, such as, for example, the application delivery server 139 or the web-based application delivery server interface 138.

In other example embodiments, if the host computer 117 does not include the plug-in, the web-based application store application 302 may display an error message within the Internet browser 310 or within a pop-up window to advise the user that the plug-in is not yet installed on the host computer 117. The error message may be presented together with a user-selectable option permitting the user of the host computer to download the plug-in by interacting with an input mechanism associated with the host computer 117. If a user selects the option to download the plug-in the request may be sent at step 504.

The request is received at the server (which may be the web-based application delivery server interface 138 or the application delivery server 139 at step 506. The server retrieves the plug-in 318 (step 508) and sends the plug-in to the host computer 117 (step 510). The host computer receives the plug-in and installs the plug-in 318 (FIG. 3) onto the host computer 117 at step 512.

The installation of the plug-in onto the host computer 117 may, in some example embodiments, occur automatically. In other example embodiments, it may be user-initiated. Whether the download and installation occurs automatically or whether it requires further user-input may depend, at least in part, on the configuration of security settings on the host computer 117.

In a similar manner, in some example embodiments, the web-based application store application may be configured to determine whether the host computer 117 contains the device driver 316 which communicates with the device 201.

First, at step 513, the web-based application store application 302 determines whether the device driver 316 is installed on the host computer 117. Next, at step 514, if the host computer 117 does not already contain the device driver, the device driver is requested. In some example embodiments, if the host computer 117 does not include the device driver, the web-based application store application 302 may automatically request the device driver from a remote server, such as, for example, the application delivery server 139 or the web-based application delivery server interface 138.

In other example embodiments, if the host computer 117 does not include the device driver, the web-based application store application 302 may display an error message within the Internet browser 310 or within a pop-up window to advise the user that the device driver 316 is not yet installed on the host computer 117. The error message may be presented together with a user-selectable option permitting the user of the host computer to download the device driver by interacting with an input mechanism associated with the host computer 117. If a user selects the option to download the device driver the request may be sent at step 514.

The request is received at the server (which may be the web-based application delivery server interface 138 or the application delivery server 139) at step 516. The server 138 or 139 retrieves the device driver 316 (step 518) and sends the device driver 316 to the host computer 117 (step 520). The host computer receives the device driver 316 and installs the device driver 316 (FIG. 3) onto the host computer 117 at step 522.

The installation of the device driver onto the host computer 117 may, in some example embodiments, occur automatically. In other example embodiments, it may be user-initiated. Whether the download and installation occurs automatically or whether it requires further user-input may depend, at least in part, on the configuration of security settings on the host computer 117.

In some example embodiments, the web-based application store application 302 (FIG. 3) is also configured to determine whether the mobile device 201 contains an application which is capable of receiving and executing commands sent from the web-based application store application 302 to the device 201. For example, in some example embodiments, it will determine whether the mobile device 201 has a compatible application store client 226 (FIG. 2). In order to determine whether the mobile device 201 contains a compatible application store client 226, the application store application may send a request (step 524) to the device 201 to provide information about any application store client installed on the device 201. The device 201 receives the request (526) and sends the requested application store client information to the host computer 117 (step 528), where it is received at step 530.

The application store client information may, in some example embodiments, be provided in the form of a version number identifying a version of the application store client installed on the device. In some example embodiments, if no application store client is installed on the device 201, the device may return a message indicating that the application store client is not installed on the device.

Since a compatible application store client 226 is not, necessarily, installed on the device at the time of the request, the request (step 524) may be sent to an application other than the application store client 226. For example, in some example embodiments, the request is issued via a command which is known to have (or which is likely to have) a compatible interpreter. For example, in some example embodiments, the request may be issued to a command interpreter native to the operating system on the device 201.

After receiving the information about any application store client installed on the device, the web-based application store application 302 may determine (at step 532), from the application store client information received at step 530, whether there is a compatible application store client 226 stored on the device. This may be determined, for example, by comparing the version number of the application store client 226 to a list of compatible versions.

The determination at step 532 may include any one or more of the following: determination if the version of the application store client 226 is compatible with the web-based application store application 302; determining if a version of the application store client 226 is available which is newer than the application store client 226 installed on the device 201; and/or determining if no application store client 226 is installed on the device 201.

In response to the existence of any one or combination of the following trigger conditions, the web-based application store application 302 may request the application store client 226 (step 534). These conditions are: a determination that the version of the application store client 226 is incompatible with the web-based application store application 302; ii) a determination that the version of the application store client 226 is available which is newer than the application store client 226 installed on the device 201; and/or iii) a determination that no application store client 226 is installed on the device 201.

The request for the application store client is received at the server at step 536. In response, the server retrieves the application store from a memory storage associated with the server at step 538 and sends the application store client to the host computer 117 at step 540. The web-based application store application 302 on the host computer 117 receives the application store client 226 from the server 139 at step 542 and sends the application store client to the device 201 at step 544.

In some example embodiments, once downloaded, the application store client 226 may be automatically installed to the device 201. That is, after the host computer has downloaded the application store client 226, it may send the application store client 226 to the device 201 together with a command to the device 201 telling the device to install the application store client on the device 201. As explained previously, since a compatible application store client 226 is not, necessarily, installed on the device at the time of the command, the command may be sent to an application other than the application store client 226. For example, in some example embodiments, the command is issued to an interpreter which is known to exist on the device 201 (or which is likely to exist). For example, in some example embodiments, the request may be issued to the operating system on the device.

After the application store client 226 has been installed on the device 201, the device 201 may send a message to the host computer 117 to advise the host computer 117 that the application store client 226 has been successfully installed to the device.

Upon receiving the message from the device advising that the application has been successfully installed on the device 201, the web-based application store application 302 may unlock additional features which require device communications. Such additional features may includes, for example, features allowing applications to be installed to the device 201 and/or features allowing the applications to be deleted from the device 201.

Application Store Interface

In at least some example embodiments, the web-based application store application 302 may be configured for allowing a user of the host computer 117 to browse or search for applications available through the application delivery server 139 and to, at the request of the user, download such application to the device 201 through the link 106 (FIG. 1).

That is, the web-based application store application provides an interface which allows a user of the host computer 117 to connect to the application delivery server 139 and to browse or search for applications available for download to the mobile communication device 201. The application store client 226 permits users of the host computer 117 to purchase applications for use on the mobile device 201.

The web-based application store application 302 may provide one or more tools to permit a user of the host computer 117 to locate applications of interest. For example, the web-based application store application may provide a search tool which allows a user of the host computer 117 to input one or more search parameters into the Internet browser and to receive search results corresponding to the one or more search parameters. The search parameters may, in various example embodiments, allow a user to specify any one or more of the following: a name of the application, a release date or date range associated with the application, a category related to the application, a cost or cost range associated with the application, one or more keywords describing the function of the application. Other parameters may also be used.

It will be appreciated that the search will typically be performed by a back-end server, such as for example, the application delivery server 139. That is, the web-based application store application 302 on the host computer 117 transmits the search parameters to the server, such as the application delivery server 139 which, in response, returns the results of the search.

The web-based application store application 302 may also permit the user of the host computer 117 to browse available applications by category type. For example, the web-based application store application 302 may provide one or more user-selectable options within the Internet browser which allow a user to browse applications in a specific category. The categories may describe the nature of the functions of the applications contained in those categories. The categories may include, for example, a game category, a productivity category, an instant messaging category, a social networking category, and/or a navigation category. Other categories are also possible.

Figure 6:
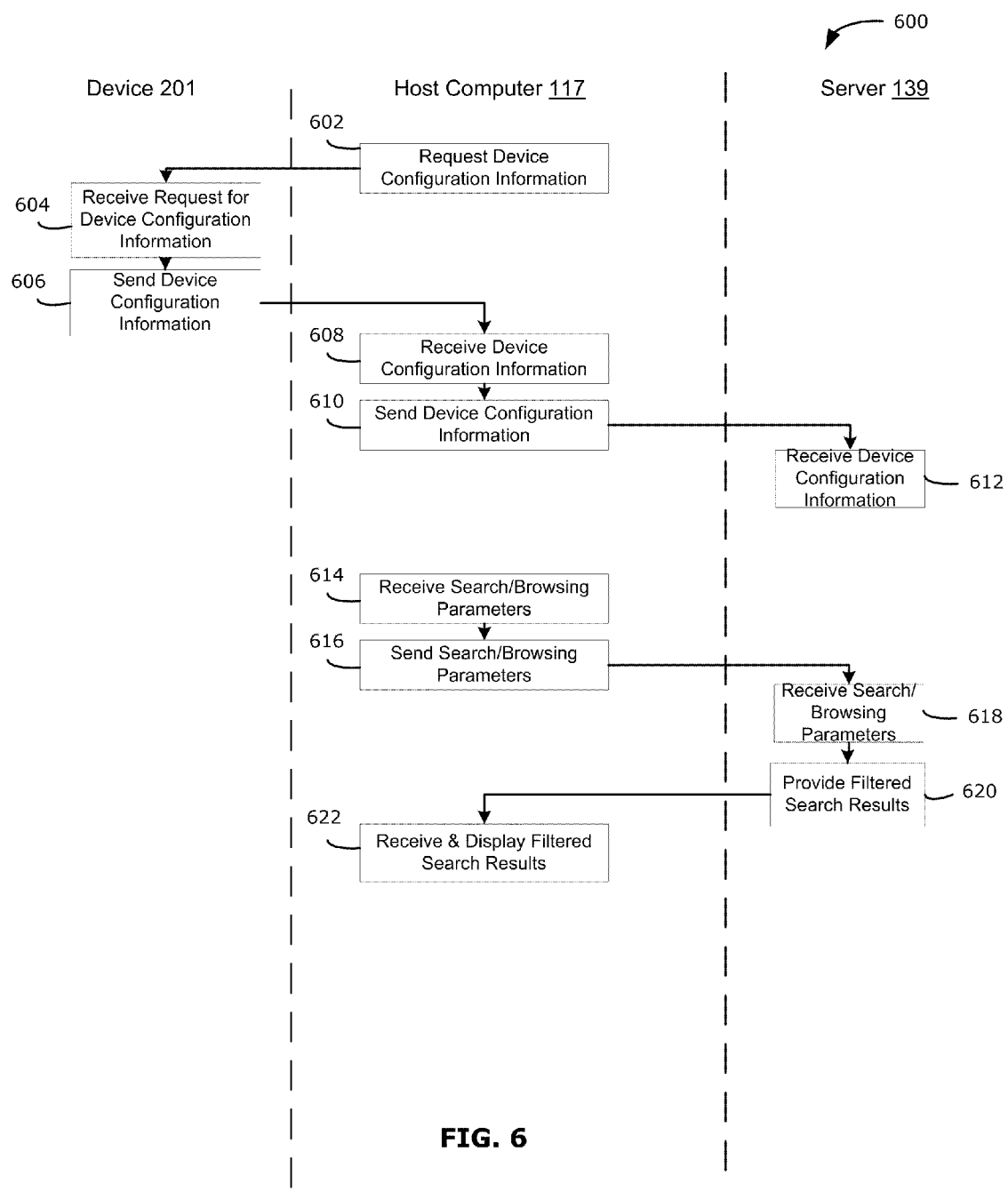
FIG. 6 is a flowchart illustrating a process for providing filtered search results in accordance with one example embodiment of the present disclosure.

Referring now to FIG. 6, in at least some example embodiments, the web-based application store application 302 may be configured to provide filtered results when searching or browsing to filter out applications that are not compatible with the device 201.

FIG. 6 illustrates a process 600 for providing filtered search results to a host-computer. The process 600 include steps which may be performed by the host computer 117 (FIG. 1), steps which may be performed by a server (which may be the application delivery server 139 (FIG. 1)), and steps which may be performed by the device 201 (FIG. 1).

More particularly, the web-based application store application 302 (FIG. 3) may contain instructions for causing a processor (not shown) associated with the host computer 117 to perform the host-computer-specific steps. Similarly, the web-based application delivery server interface 138 (FIG. 1) and/or the application delivery server 139 may contain instructions for causing a processor associated with either of these servers to perform the server-specific steps. The application store client 226 (FIG. 2) may contain instructions for causing the processor 240 (FIG. 2) associated with the device 201 to perform the device-specific steps.

In order to provide this functionality, the web-based application store application 302 may send a request (step 602) to the device to receive device configuration information from the device 201. The device 201 may be configured to receive the request (step 604) for device configuration information and to return (step 606), to the host computer 117 the requested device configuration information. The device configuration information may relate to the capabilities of the device 201 and/or the applications contained thereon. The device configuration information may, in various example embodiments, include operating software version information identifying the version number of operating system software currently installed on the device. In some example embodiments, the device configuration information may include a model number associated with the device. In some example embodiments, the device configuration information may specify whether specific hardware is installed on the device. In some example embodiments, the device configuration information may specify whether specific hardware is enabled on the device. Other device configuration information is also possible.

The web-based application store application 302 (FIG. 3) may receive the device configuration information (608) and provide filtered results during searching and/or browsing. That is, the results which are provided may be filtered so that only applications which are compatible with the device are displayed.

In some example embodiments, in order to provide filtered search results, the device configuration information may be provided (steps 610 and 612) to the remote server (such as the application delivery server 139) which is powering the searching and/or browsing functions.

Search parameters or browsing parameters may be received from an input mechanism of the host computer at the web-based application store application 302 (FIG. 3) at step 614 and sent to the server 139 at step 616. The server may receive the search and/or browsing parameters (step 618) and return filtered results to the web-based application store application (620). The filtered search results are received and displayed in the Internet browser 310 (FIG. 3) of the host device 210 at step 622. The filtered results may be filtered so that applications which are not compatible with the device 201 are not displayed.

In at least some example embodiments, the web-based application store application 302 may be configured to provide filtered results when searching or browsing to filter out applications that are already installed on the device 201.

In order to provide this functionality, the web-based application store application 302 may send a request to the device for installed application information identifying applications installed on the device (i.e. the device information requested at step 602 may, among other things, be a request for a list of installed applications). The device 201 may be configured to receive the request for installed application information and to return, to the host computer 117 the requested installed application information. The installed application information may include identifiers of all applications that are currently installed on the device 201. The installed application information may include version numbers associated with the applications installed on the device 201.

In some example embodiments, filtered results may automatically be provided during searching and/or browsing. In other example embodiments, the host computer 117 may present the user with a user-selectable option allowing the user to filter results in the manner specified above. For example, in some example embodiments, this option may be provided in a window which allows search parameters for a search to be input.

Figure 7:
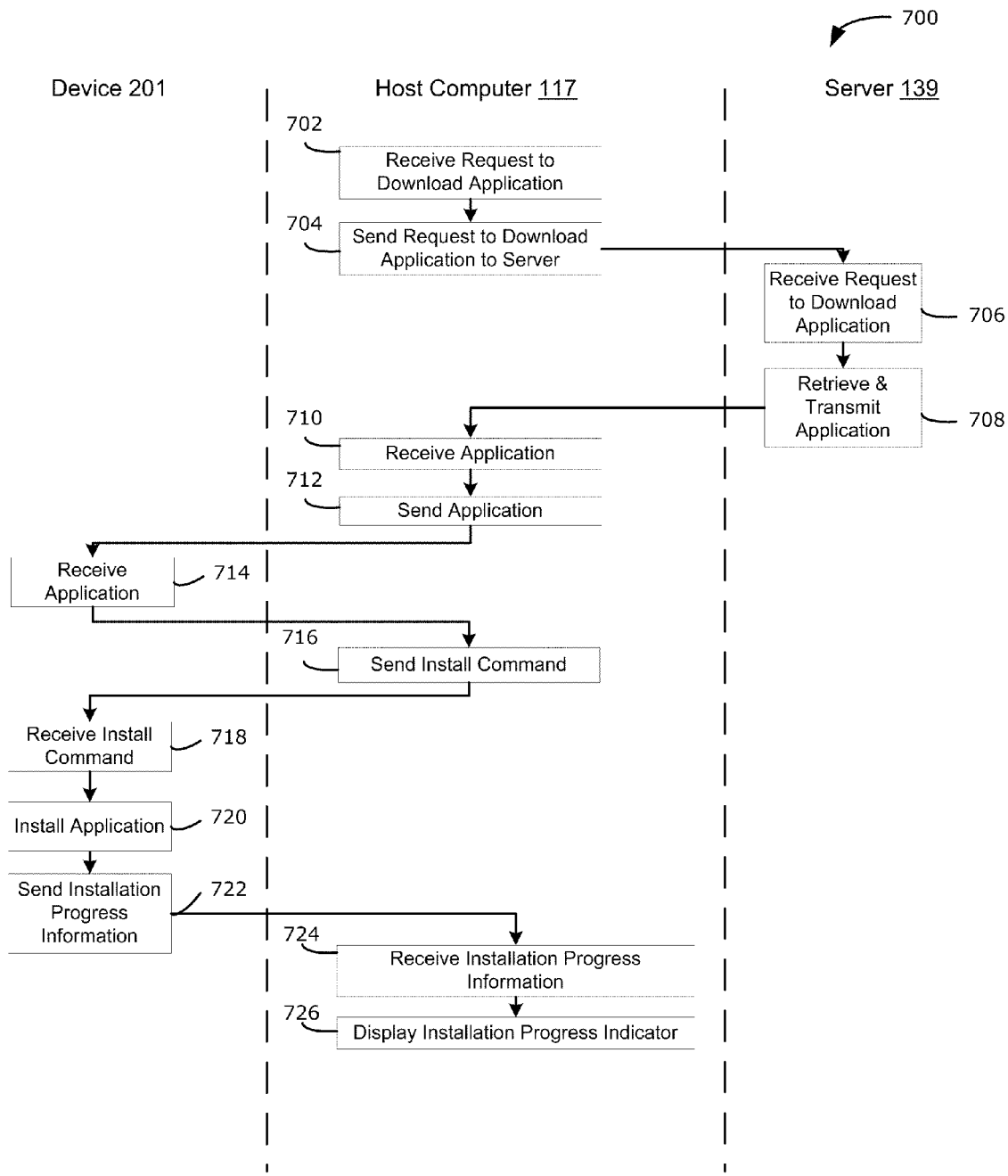
FIG. 7 is a flowchart illustrating a process for triggering a transmittal of an application in accordance with one example embodiment of the present disclosure.

Referring now to FIG. 7, a process 700 for triggering a transmittal of an application to a device connected to a host computer is illustrated. The process 700 includes steps which may be performed by the host computer 117 (FIG. 1), steps which may be performed by a server (which may be the application delivery server 139 (FIG. 1)), and steps which may be performed by the device 201 (FIG. 1).

More particularly, the web-based application store application 302 (FIG. 3) may contain instructions for causing a processor (not shown) associated with the host computer 117 to perform the host-computer-specific steps. Similarly, the web-based application delivery server interface 138 (FIG. 1) and/or the application delivery server 139 may contain instructions for causing a processor associated with either of these servers to perform the server-specific steps. The application store client 226 (FIG. 2) may contain instructions for causing the processor 240 (FIG. 2) associated with the device 201 to perform the device-specific steps.

The web-based application store application 302 may present a user with a user selectable option on the host computer 117 to download an application to the device 201. A user may input instructions through the Internet browser to download the application to the device 201 by using an input mechanism associated with the host computer 117, such as, for example, a mouse or other navigational input mechanism. The instructions are received by the host computer at step 702.

In response to receiving instructions to download the application to the device, the web-based application store application 302 may: transmit a request for the application to the application delivery server (step 704); receive the application from the application delivery server at the host computer (step 706); and transmit the application from the host computer to the device (step 712).

The request for the application may be transmitted (at step 704) together with an identifier of the specific application related to the request. For example, the request may be transmitted with a unique identification number assigned to the specific application. The application delivery server 139 receives the request (step 706) for the application and, in response, retrieves the application related to the request from storage and transmits the application related to the request to the host computer 117 (step 708).

In at least some example embodiments, upon receiving the application (step 710), the host computer may automatically transmit the application to the device 201 (step 712). That is, the application may be transmitted to the device without further input required from the user. The application is received at the device at step 714. In some example embodiments, while the application is being downloaded, a progress indicator which indicates the progress of the download may be displayed on the host computer 117.

In at least some example embodiments, the host computer 117 may also automatically transmit an installation command (step 716) to the device to automatically install the application to the device. The installation command is received by the application store client 226 of the device 201 (step 718) and, as a result, the application store client 226 automatically installs the application to the device (step 720).

In at least some example embodiments, upon transmitting the application, the host computer may automatically transmit the installation command to the device 201. That is, the step 716 in which the installation command is transmitted to the device may be performed without further input required from the user.

In at least some example embodiments, the device 201 may be configured to provide installation progress information to the host computer 117 (step 722) to advise the host computer of the progress of the installation. The installation progress information may, for example, quantify or otherwise indicate the progress of the installation. To this end, the installation progress information may include percentage complete information and/or installation time remaining information.

The installation progress information may be received by the web-based application store application 302 (at step 724) and used to display (at step 726), in the Internet browser, an installation progress indicator to visually indicate to the user of the host computer 117 the progress of the installation on the device 201.

In at least some example embodiments (not shown), the web-based application store application may be configured to determine whether a downloaded application requires the device to be reset in order to function properly. In order to make this determination, the web-based application store application 302 may rely on application information received from a server, such as the application delivery server 139. The application information may specify whether the application requires or recommends the device to be reset. If the application information indicates that a reset is required (or in some example embodiments recommended), the web-based application store application may determine whether installation is completed in accordance with installation progress information received from the device 201. After installation is completed, if the application requires a reset of the device, the web-based application store application may send a reset command to the device to reset the device 201. The reset command may be received by the application store client 226. When the reset command is received by the application store client 226, the application store client 226 may reset the device 201.

In at least some example embodiments (not shown), the application delivery server 139 may provide at least some applications which require payment in order to download, install or use the applications on a device 201. In such example embodiments, the web-based application store application may allow users of the host computer to purchase such applications. In some example embodiments, in order to purchase an application, a user of the host computer 117 inputs login information to the web based application store application 302 on the host computer 117 using an input mechanism associated with the host computer. The login information may be associated with a user account. The host computer 117 may transmit the login information to a server, such as the application delivery server 139, where the login information is authenticated. Payment may then be charged to an account associated with the user. Other methods of payment are also possible.

In some example embodiments (not shown), the web-based application store application 302 may be configured to receive memory usage information from the device 201. When a user-generated request to download an application is received at the host computer 117, the web-based application store application may be configured to determine whether there is sufficient memory on the device 201 for the installation. The web-based application store application may make the determination by comparing the memory usage information (which indicates available memory on the device 201) and application size information regarding the application. The application size information may be obtained from the application delivery server 139. If the amount of space after the installation of the software would be less than a predetermined threshold (i.e. if: available memory−application size information<threshold), then the download or installation of the application may not be allowed.

It will be appreciated that, in some example embodiments, at least some of the features or functions described above by the web-based application store 302, may be provided by another component or module on the host computer 117. For example, in some example embodiments, the plug-in 318 (FIG. 3) may provide for at least some of the download functions described above. That is, the web-based application store 302 may interact with the plug-in 318 to provide some of the functionality described herein. In one example embodiments, the web-based application store may receive the request to download the application (step 702) and may send a request to the application delivery server for a location of the file on the application delivery server 139. The application delivery server 139 may return the location of the file (for example, in the form of a URL) to the web-based application store, which may pass the location to the plug-in. The plug-in may then send the request to download the application at step 704 and may receive the application at step 710. The plug-in 318 may, at steps 704 and 710, download the application over HTTP from the specified URL and deliver it to the device at step 714.

Remote Storage Interface

Figure 8:
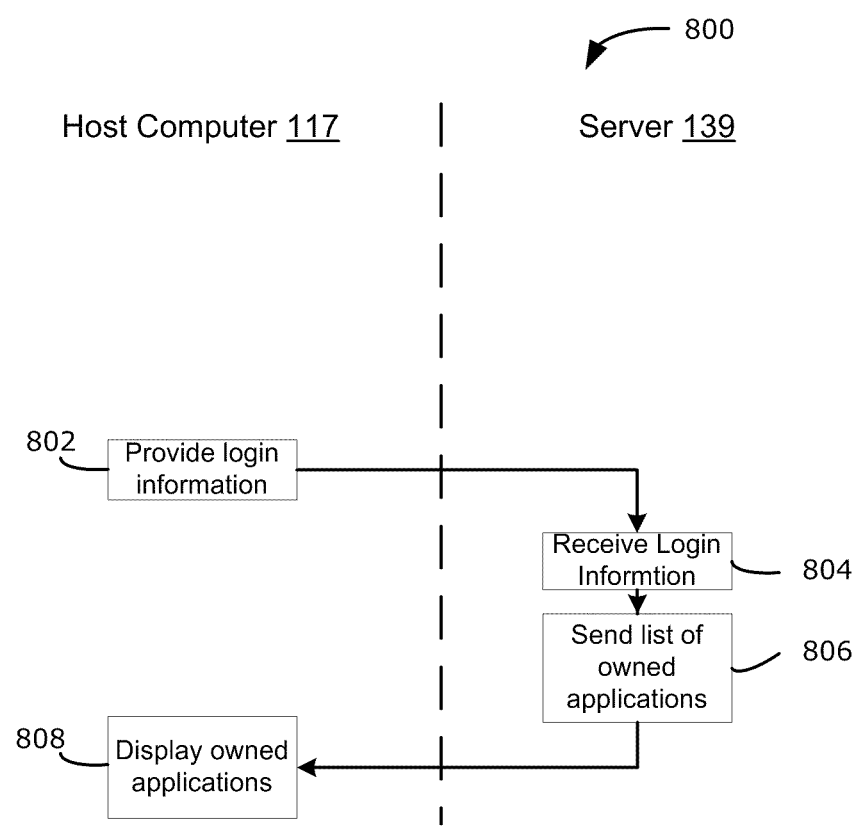
FIG. 8 is a flowchart illustrating a process for implementing remote storage in accordance with one example embodiment of the present disclosure.

Referring now to FIG. 8, the web-based application store application 302 may, in some example embodiments, include a remote storage interface which is configured to permit applications which have been removed from the device 201 (or in some example embodiments, from a device associated with the same user) to be reinstalled to the device 201 following their removal.

FIG. 8 illustrates a process for implementing remote storage. The process 800 of FIG. 8 includes steps which may be performed by the host computer 117 (FIG. 1) and steps which may be performed by a rights management server, which may, in some example embodiments, be the application delivery server 139 (FIG. 1). In this example embodiment, the host-computer specific steps may be provided for the web-based application store application. That is, the web-based application store application may contain instructions for causing a processor associated with the host computer to perform the host-computer specific steps of the process 800. Similarly, the application delivery server 139 (or other rights management server) may contain instructions for causing a processor associated with the web-based application delivery interface 138 to perform the server specific steps.

The web-based application store application 302 may provide an interface to view applications that a user or device already has access rights to; for example, by virtue of a previous download or purchase. Applications that a user has rights to may, in some example embodiments, be viewed through in a separate portion of the web-based application store application 302. This portion of the web-based application store application may only display applications which a user or device has rights to so that a user may separately view applications which they already have rights to. That is, applications which a user or device has rights to may be displayed within the Internet browser 310 in a display window which does not also list other applications which are available for purchase which a user does not already have rights to.

A user may access the remote storage interface of the web-based application store application 302, by selecting an option entitled "Digital Storage Locker", "Remote Applications", "Previously Downloaded Applications" or "My World™" or an option with another similar descriptor.

In order to determine which applications a user or device 201 has rights to (i.e. which applications have been previously purchased or downloaded), the web-based application store application 302 may, at step 802, provide login information to a rights management server (not shown) which tracks access rights to applications. The rights management server may, in some example embodiments, be implemented on the application delivery server 139. That is, the application delivery server 139 may be configured to track downloads and/or purchases in order to track the devices 201 and/or users which have already obtained installation rights for the application.

In some example embodiments, in order to enter the remote store interface portion of the web-based application store application, a user of the host computer 117 inputs login information to the web based application store application on the host computer using an input mechanism associated with the host computer. The login information may be associated with a user account. The host computer 117 may transmit the login information to a server (at step 802), such as the application delivery server 139, where the login information is authenticated. The application delivery server 139 (or other rights management server) receives the login information (step 804) and, in response, transmits a list of applications that a user (or device as the case may be) has rights to (step 806). In at least some example embodiments, the list is a list of applications previously downloaded to a device associated with the login information.

The web-based application store application receives the list of applications that the user has rights to and displays the applications in the list in the Internet browser (step 808). The web-based application store application displays at least one user selectable option to download at least one of the applications to the device 201.

If a user selects a selectable option to download an application to the device, the application is retrieved from the application delivery server 139 and installed to the device in the manner described above with reference to FIG. 7.

Delete Applications on Device

In at least some example embodiments, the web-based application store application 302 may provide for other device management functions. Such functions may include, for example, the ability to uninstall and delete applications installed on the device.

Figure 9:
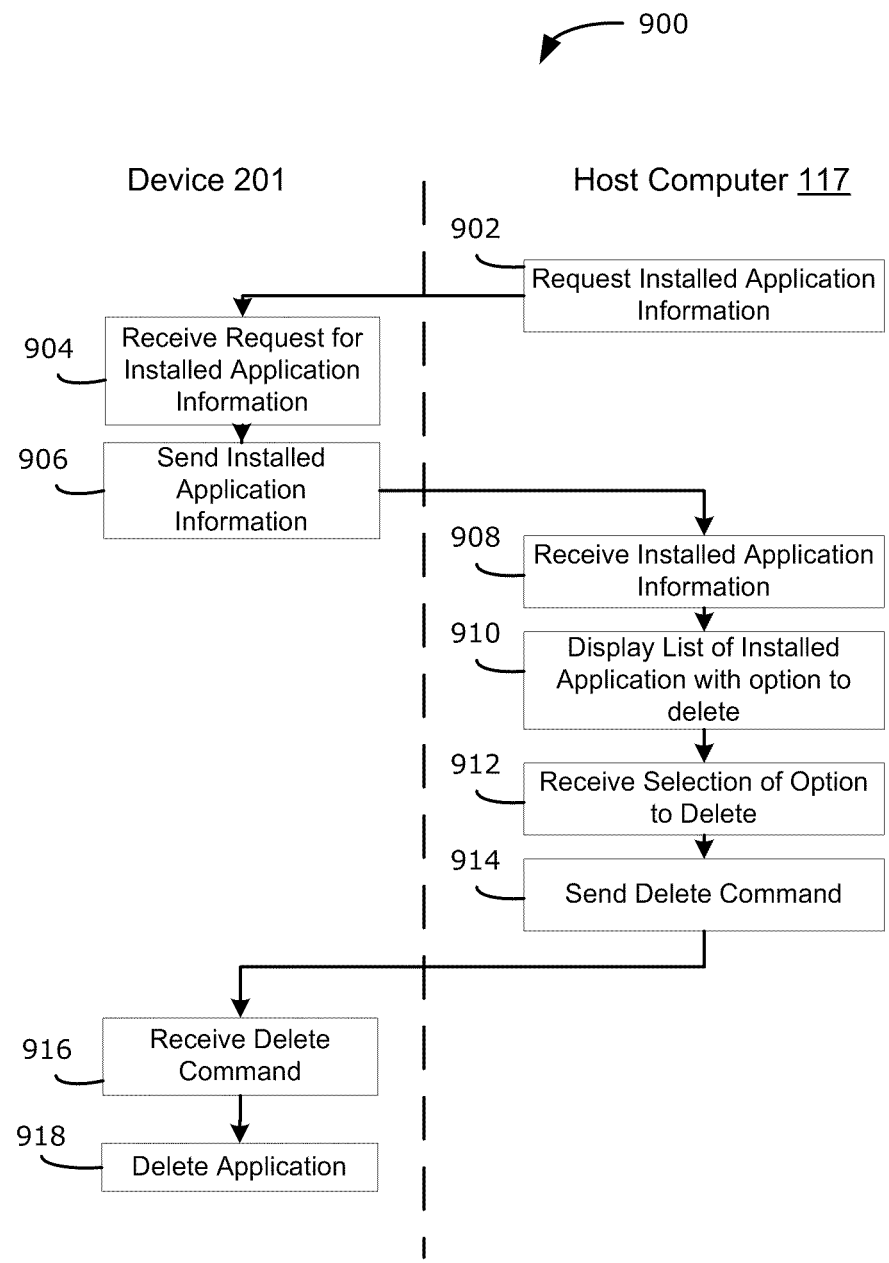
FIG. 9 is a flowchart illustrating a process for deleting an application from a device in accordance with one example embodiment of the present disclosure.

FIG. 9 illustrates a process 900 for deleting an application from the device 201. The process 900 of FIG. 9 includes steps which may be performed by the host computer 117 (FIG. 1) and steps which may be performed by the device 201. In this example embodiment, the host-computer specific steps may be provided for the web-based application store application (FIG. 3). That is, the web-based application store application may contain instructions for causing a processor associated with the host computer to perform the host-computer specific steps of the process 900. Similarly, the application store client 226 may contain instructions for causing a processor 240 associated with the device 201 to perform the device specific steps.

The web-based application store application 302 may request that the device provide information about the applications currently installed on the device (step 902). The request is received at step 904 and installed application information is sent at step 906. This information is received at the host computer at step 908.

Based on this information, the web-based application store application 302 may display (at step 910), in the Internet browser, a list of at least some of the applications currently installed on the device 201 together with one or more user selectable option to delete applications installed on the device 201.

A user of the host computer 117 may select the user selectable option via an input mechanism associated with the host computer 117. If a user selects an option to delete an application installed on the device 201 (step 912), a delete command may be transmitted from the host computer 117 to the device 201 (step 914). The delete command is received by the application store client 226 (step 916) which, as a result of receiving the command, uninstalls and/or deletes the application from the device (step 918). In at least some example embodiments (not shown), the application store client 226 sends a message back to the host computer 117 after the deletion to confirm that the application has been deleted.

Figure 10:
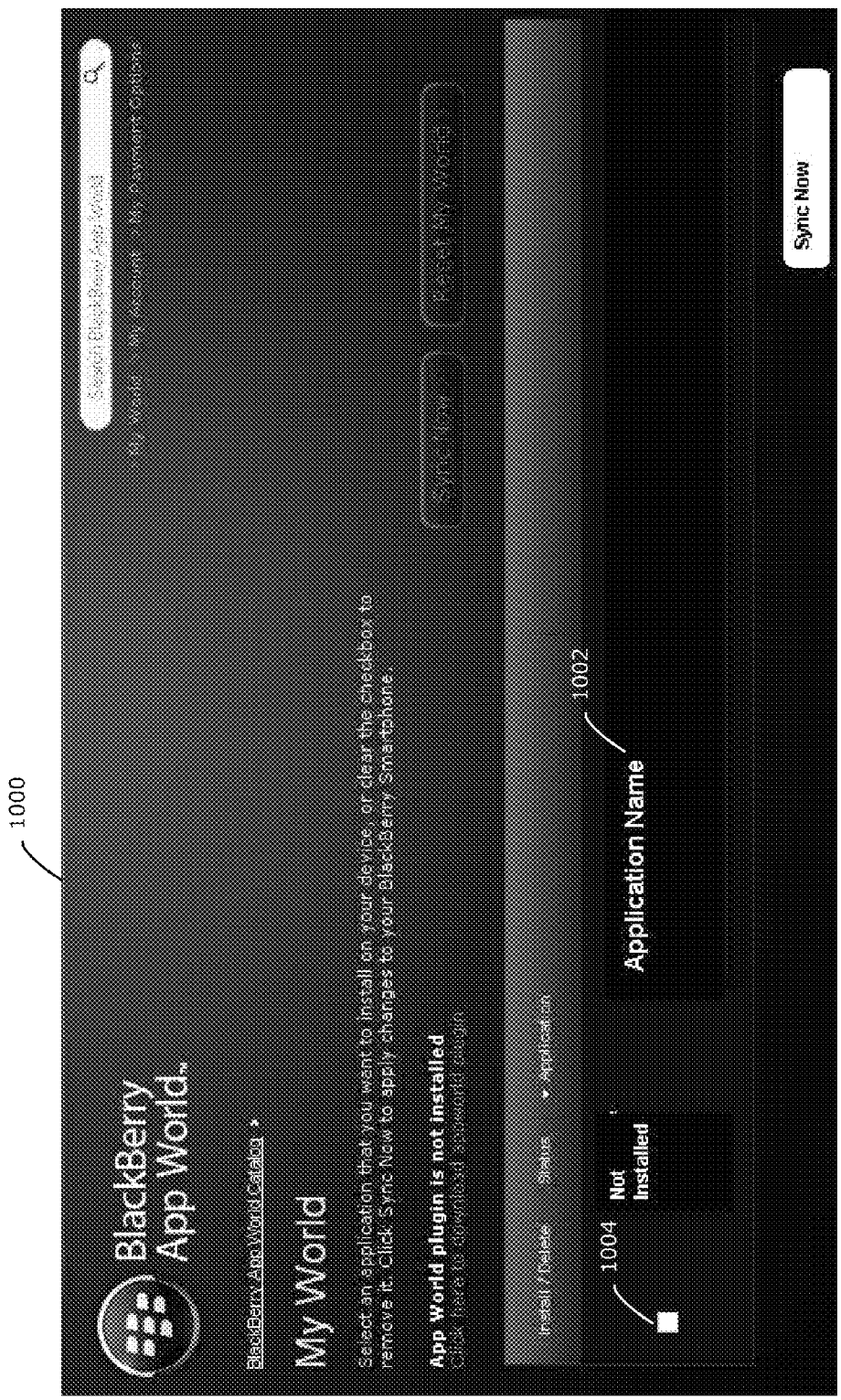
FIG. 10 is a screenshot of an example device sync screen in accordance with an example embodiment of the present disclosure.

In at least one example embodiment, the remote storage process described above with reference to FIG. 8 and the application deletion process described above with reference to FIG. 9 may be accessed via a common device-sync screen. FIG. 10 illustrates an example screen shot 1000 of a device-sync screen which provides remote storage capabilities and application deletion capabilities. The device-sync screen displays a list 1002 of applications that a user has rights to (for example, a list of applications previously downloaded to a device associated with login information transmitted from the host computer). The web-based application store application 302 (FIG. 3) determines, based on information about the applications currently installed on the device received from the device 201, which of the applications in the list are not currently installed on the device. Based on the result of the determination, the web-based device management application displays, in the Internet browser, a user selectable option 1004 to provide instructions to the web browser to download the applications to the device which are available for download and which are not currently installed on the device.

The web-based device management application also displays, in the Internet browser, a user selectable option 1004 to delete the applications which are currently installed to the device. In response to receiving instructs to delete the application from the device, the web-based device management application sends a command from the host computer to the device to delete the application.

In the example embodiment shown, the device-sync display screen displays each application which the user has rights to together with a user selectable indicator 1004 indicating whether the application should be installed to the device. The selectable indicator 1004 is populated based on the list of currently installed application on the device 201. For example, the selectable indicator 1004 may be pre-selected for all applications currently installed on the device. The user may deselect any one of the selected indicators to delete the application from the device. Similarly, a user may select any one of the unselected indicators to install the application to the device.

In will be appreciated that, in some example embodiments, many of the features described above with respect to the web-based-application store application 302 may, instead, be provided by the plug-in 318 or by another software component or module on the host computer 117. For example, in some example embodiments, the web-based-application store application 302 acts as a user interface and receives input commands via an input mechanism associated with the device, but the plug-in performs many of the downloading and/or installing functions.

In accordance with further example embodiments of the present disclosure, there is provided apparatus such as a data processing system (e.g. computer and/or server) for implementing the methods described herein, a computer program product comprising a computer readable medium having stored thereon computer program instructions for implementing the methods described herein on a suitable data processing system, as well as a computer data signal having program instructions recorded therein for practising the methods of the present disclosure on a suitable data processing system.

In accordance with further example embodiments of the present disclosure, there are provided a computer program product comprising a computer readable medium having stored thereon computer executable instructions comprising instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

FIGS. 4-9 are flowcharts illustrating example embodiment methods (also referred to herein as processes). Some of the steps illustrated in the flowcharts may be performed in an order other than that which is described. Also, it should be appreciated that not all of the steps described in the flow charts are required to be performed, that additional steps may be added, and that some of the illustrated steps may be substituted with other steps.

The example embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for triggering a transmittal of an application to a device connected by a link to a host computer, the link comprising a direct cable connection or a short-range wireless connection, the method comprising:
  determining whether a web-browser plug-in is installed on the host computer, the web-browser plug-in being configured to enable communications between a web-browser and the device over the link;
  if the web-browser plug-in is not installed, providing for the installation of the plug-in to the host computer;

when the web-browser plug-in is installed, displaying in the web browser on the host computer a list of at least two applications available for download to the device;
displaying a selectable option in the web browser to download one of the applications to the device;
receiving instructions through the selectable option displayed in the web browser to download the application to the device; and
in response to receiving instructions through the web browser to download the application to the device:
 transmitting a request for the application from the host computer to an application delivery server;
 receiving the application from the application delivery server at the host computer; and
 transmitting the application from the host computer to the device using the web-browser plug-in installed on the host computer.

2. The method of claim 1, wherein the device is a USB enabled device which is connected to the host computer via a USB connection.

3. The method of claim 1, further comprising: transmitting an installation command to the device to automatically install the application to the device.

4. The method of claim 3, further comprising:
receiving, at the host computer, installation progress information from the device; and
displaying an installation progress indicator in the web browser in accordance with the installation progress information.

5. The method of claim 1, further comprising:
transmitting login information from the host computer to the application delivery server; and
receiving from the application delivery server the list of at least one application available for download to the device, and wherein the list of at least one application is a list of applications previously downloaded to a device associated with the login information.

6. The method of claim 5 further comprising:
receiving a list of currently installed applications on the device; and
displaying, in the web-browser, a list of applications currently installed to the device.

7. The method of claim 6, further comprising:
receiving instructions through the web browser for deleting at least one of the applications in the list of applications currently installed to the device; and
in response to receiving instructions to delete the application from the device:
 sending a command from the host computer to the device to delete the application.

8. The method of claim 1, further comprising:
receiving configuration information at the host computer from the device, and wherein the applications in the list of at least one application available for download to the device are applications which are determined to be compatible with the device based on the configuration information.

9. The method of claim 1, wherein providing for the installation of the plug-in comprises:
displaying a plug-in download prompt in the web-browser;
receiving instructions through the web browser to download the plug-in to the device; and
in response to receiving instructions to download the plug-in to the device:
 transmitting a request for the plug-in to an application delivery server;
 receiving the plug-in from the application delivery server at the host computer; and
 installing the plug-in to the host computer.

10. The method of claim 1 further comprising:
transmitting login information from the host computer to the application delivery server;
receiving from the application delivery server the list of the at least one application available for download to the device, and wherein the list of at least one application is a list of applications previously downloaded to a device associated with the login information; and
receiving from the device a list of applications currently installed on the device;
determining, at the host computer, which of the applications in the list of applications available for download are not currently installed on the device; and
displaying, in the web browser, a selectable option to provide instructions to the web browser to download the applications to the device which are available for download and which are not currently installed on the device.

11. The method of claim 10 further comprising:
displaying, in the web browser, a selectable option to delete the applications which are currently installed to the device, and in response to receiving instructions to delete the application from the device, sending a command from the host computer to the device to delete the application.

12. The method of claim 1, further comprising:
determining whether the application requires a reset of the device; and
if the application requires a reset of the device, sending a command to the device to reset the device.

13. The method of claim 1, further comprising:
receiving, at the host computer, memory usage information from the device, the memory usage information indicating the amount of memory available on the device; and
prior to transmitting the application to the device, determining whether the device has sufficient memory to permit the installation of the application to the device based on the memory usage information, application size information for the application and at least one predetermined threshold.

14. A server comprising:
a memory storing a web application configured to:
 determine whether a web-browser plug-in is installed on a host computer, the web-browser plug-in being configured to enable communications between a web-browser and a device over the link;
 if the web-browser plug-in is not installed, provide for the installation of the plug-in to the host computer;
 when the web-browser plug-in is installed, display in the web browser on the host computer a list of at least two applications available for download to the device connected by a link to the host computer, the link comprising a direct cable connection or a short-range wireless connection;
 display a selectable option in the web browser to download one of the applications to the device;
 receive instructions through the selectable option displayed in the web browser to download the application to the device; and
 in response to receiving instructions through the web browser to download the application to the device, interacting with the web-browser plug-in associated with the host computer to:

transmit a request for the application from the host computer to an application delivery server;

receive the application from the application delivery server at the host computer; and transmit the application from the host computer to the device using the web-browser plug-in installed on the host computer.

15. The server of claim 14, wherein the web application is further configured to:

transmit an installation command to the device to automatically install the application to the device.

16. The server of claim 14, wherein the web application is further configured to:

transmit login information from the host computer to the application delivery server; and receive from the application delivery server the list of at least one application available for download to the device, and wherein the list of at least one application is a list of applications previously downloaded to a device associated with the login information.

17. The server of claim 14, wherein the web application is further configured to:

receive a list of currently installed applications on the device; and display, in the web-browser, a list of applications currently installed to the device.

18. The server of claim 14, wherein the web application is further configured to:

receive instructions through the web browser for deleting at least one of the applications in the list of applications currently installed to the device; and in response to receiving instructions to delete the application from the device:

send a command from the host computer to the device to delete the application.

19. The server of claim 14, wherein the web application is further configured to:

receive configuration information at the host computer from the device, and wherein the applications in the list of at least one application available for download to the device are applications which are determined to be compatible with the device based on the configuration information.

20. The server of claim 14, wherein the web application is further configured to:

display a plug-in download prompt in the web-browser;

receive instructions through the web browser to download the plug-in to the device; and in response to receiving instructions to download the plug-in to the device:

transmit a request for the plug-in to an application delivery server;

receive the plug-in from the application delivery server at the host computer; and install the plug-in to the host computer.

21. The server of claim 14, wherein the web application is further configured to:

transmit login information from the host computer to the application delivery server;

receive from the application delivery server the list of the at least one application available for download to the device, and wherein the list of at least one application is a list of applications previously downloaded to a device associated with the login information; and receive from the device a list of applications currently installed on the device;

determine which of the applications in the list of applications available for download are not currently installed on the device; and display, in the web browser, a selectable option to provide instructions to the web browser to download the applications to the device which are available for download and which are not currently installed on the device.

22. The server of claim 21, wherein the web application is further configured to:

display, in the web browser, a selectable option to delete the applications which are currently installed to the device, and in response to receiving instructions to delete the application from the device, send a command from the host computer to the device to delete the application.

23. The server of claim 14, wherein the web application is further configured to:

determine whether the application requires a reset of the device; and if the application requires a reset of the device, sending a command to the device to reset the device.

24. A computer program product comprising a non-transitory computer readable storage medium having encoded thereon computer executable instructions for triggering a transmittal of an application to a device connected by a link to a host computer, the link comprising a direct cable connection or a short-range wireless connection, the computer executable instructions comprising:

computer executable instructions for determining whether a web-browser plug-in is installed on the host computer, the web-browser plug-in being configured to enable communications between a web-browser and the device over the link;

if the web-browser plug-in is not installed, computer executable instructions for providing for the installation of the plug-in to the host computer;

when the web-browser plug-in is installed, computer executable instructions for displaying in the web browser on the host computer a list of at least two applications available for download to the device;

computer executable instructions for displaying a selectable option in the web browser to download one of the applications to the device;

computer executable instructions for receiving instructions through the selectable option displayed in the web browser to download the application to the device; and computer executable instructions executable in response to receiving instructions through the web browser to download the application to the device, the computer executable instructions being configured for:

transmitting a request for the application from the host computer to an application delivery server;

receiving the application from the application delivery server at the host computer; and transmitting the application from the host computer to the device using the web-browser plug-in installed on the host computer.

* * * * *